No. 700,833. Patented May 27, 1902.
J. SCHNEIBLE.
MANUFACTURE OF FERMENTED LIQUORS.
(Application filed Feb. 20, 1902.)
(No Model.)
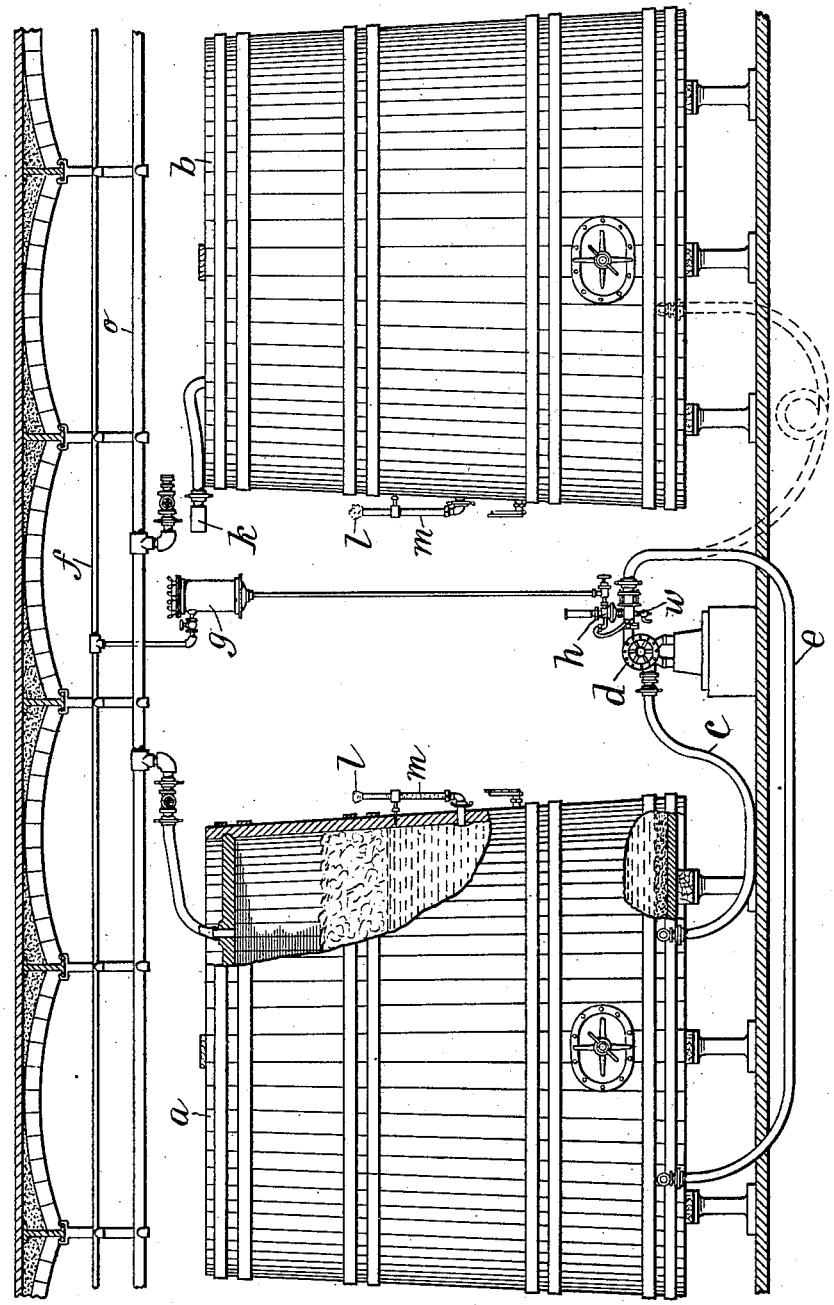
Witnesses
Inventor
Joseph Schneible
By his Attorneys

UNITED STATES PATENT OFFICE.

JOSEPH SCHNEIBLE, OF NEW YORK, N. Y.

MANUFACTURE OF FERMENTED LIQUORS.

SPECIFICATION forming part of Letters Patent No. 700,833, dated May 27, 1902.

Application filed February 20, 1902. Serial No. 94,888. (No model.)

*To all whom it may concern:*

Be it known that I, JOSEPH SCHNEIBLE, a citizen of the United States, whose residence and post-office address is borough of Manhattan, city, county, and State of New York, have invented certain new and useful Improvements in the Manufacture of Fermented Liquors, of which the following is a specification, reference being had to the accompanying drawing.

This invention relates particularly to the carrying on of the fermentation of liquors—such as malt beverages, for example—and to the culture, propagation, and separation of yeast for further use. As the fermentation of such liquors is now commonly practiced the yeast propagated for further use is separated and collected under conditions which are liable to result in contamination of the yeast by contact with air, usually teeming with wild ferments and very often with fungi, and in subsequent injury to the finished product.

It is the object of this invention to provide for the carrying on of the fermentation and the separation of the yeast in such a manner as to avoid exposure of either yeast or liquor to such contaminating and injurious influences, while at the same time the fermentation is carried on under practically normal conditions as to pressure.

In accordance with this invention the newly-fermented liquor containing the yeast in suspension for further inoculation is transferred from the vessel in which the fermentation was carried on to a clean vessel, in which the separation of the yeast intended for further work from the liquor takes place and from which the liquor is withdrawn, thereby leaving the yeast in the clean vessel. The further quantity of liquor to be fermented is then introduced into the vessel containing the yeast and is inoculated thereby, thus avoiding altogether the removal of the yeast from the vessel in which the same has been allowed to separate from the fermented liquor and avoiding its exposure to the contaminating influences above referred to. This process is carried on successively in the manner referred to, the newly-fermented liquor being transferred from the vessel in which the inoculation has taken place and the main fermentation was carried on to a clean vessel, as before.

The invention will be somewhat more fully described hereinafter with reference to the accompanying drawing, in which, for the purpose of illustration and explanation of the nature of the invention, is shown an apparatus adapted for the practice of the invention, such drawing presenting a view of the apparatus in side elevation, partly broken out to show details.

In the apparatus represented in the drawing the vessel $a$ may represent that vessel in which the first or main fermentation is carried on, the liquor therein having been pitched or inoculated with yeast, preferably pure cultured yeast derived from any suitable source. The liquor to be fermented, it will be understood, has been previously prepared in any suitable manner, preferably, however, having been aerated in a hot state as it is drawn from the brew-house, then properly cooled without exposure to atmospheric air, and again aerated, and finally delivered into a closed fermenting vessel, such as that represented at $a$. Within the first twenty-four hours after the wort has been inoculated with the yeast contained in the fermenting vessel, and preferably as soon as a rise in temperature of the liquid to be fermented manifests itself, the liquor pitched with yeast is again thoroughly and effectively aerated with sterilized air in any convenient way, but preferably by means of a jet apparatus $n$, operated by a suitable pump $d$, the sterilized air being supplied by pipe $f$ through a suitable air-filter $g$, and the quantity of air to be introduced into the passing liquor being controlled by a suitable valve $h$. The liquor is supplied from vessel $a$ to the pump $d$ through pipe $c$, aerated by means of jet apparatus $n$, and through pipe $e$ returned to the vessel from which it came. This circulation and aeration of the liquor are continued until the same becomes thoroughly saturated with pure atmospheric air, which supplies the oxygen necessary for and needed by the yeast to obtain the best results for its propagation and its highest stage of development and energetic fermentation. In the vessel $a$ the fermentation is allowed to proceed, the carbonic-acid gas being allowed to escape, as is well understood. In the arrangement shown in the drawing a pipe-line o may be connected to the vessels a and b by suitable pipes or hose p for the purpose of conducting the gas from the vessels; but it is obviously immaterial, so far as this invention is concerned, how the gas is permitted to escape from the vessels. As soon as the yeast attacks the fermentable sugar a rise of temperature necessarily follows until the highest stages of fermentation are reached, during which period new yeast is produced, and the new crop brought forth by the mother-yeast cells separates therefrom and thrives of itself. As soon as the yeast has practically expended its energy on the fermentable matter, which is indicated by the rise of temperature to its maximum, it will be found that the apparent attenuation of the fermentable matter in the liquor has been almost completed. The liquor carrying the most active yeast suspended therein is then transferred from the vessel a to a clean closed vessel b in any convenient manner, but preferably by a suitable pump d and suitable pipe or hose connections, (indicated by dotted lines at p,) to the second vessel b at or near its bottom. If bottom-fermenting yeast is employed in the first or main fermentation, the waste yeast will settle to the bottom of the vessel a before the liquor is transferred, leaving the liquor to be drawn from above it through the pipe c. The hop resins and such other impurities as have risen to the top of the liquor during the fermentation will descend on the surface of the liquor as the same is withdrawn, the transfer of the liquor being stopped as soon as such undesirable matters reach the outlet. Of course if top-fermentation yeast is employed in the first or main fermentation the waste yeast instead of settling to the bottom of the vessel before the transfer is begun will rise to the top and then descend on the surface of the liquor as the same is withdrawn. In either case the liquor which is transferred is separated from the waste yeast and from other undesirable matters and carries the active yeast to be separated for future use in suspension.

The agitation caused by the transfer of the liquor from one vessel into the other causes some of the carbonic-acid gas to become disengaged from the liquor, which hastens the complete fermentation desirable.

After the subsidence of the fermentation above referred to the yeast in the liquor either rises to the top of the fermented liquor when top-fermentation yeast is used or sinks to the bottom of the fermented liquor when bottom-fermentation yeast is used. After such separation of the yeast in the vessel b as just described the liquor is withdrawn from the vessel to be further treated as may be required for finishing.

The yeast which has separated from the liquor either by settling to the bottom or by rising to the top is retained in the vessel b after the liquor is withdrawn and is then ready to have added to it in the same vessel the desired quantity of unfermented liquor, and the first or main fermentation of such newly-introduced liquor is carried on in said vessel b in the same manner as already described with reference to the first or main fermentation in the vessel a.

The quantity of yeast which is desired for further use is easily controlled by lengthening or shortening the time allowed for separation in the vessel in which such separation is to take place, or the time of transfer of the fermented liquor from the vessel in which the first or main fermentation has taken place to the vessel in which the separation of the yeast takes place may be varied in order to secure a less or a greater separation of yeast in the second vessel. The process, as far as this is concerned, is mainly governed by the nature and separating quality of the yeast; but in the practice of this method it has been found that the preferable time to transfer the liquor from the first or main fermenting vessel into the second vessel is when the highest point of temperature of the fermenting liquor has been reached. The time after the transfer allowed for separation is mainly governed by the separating quality of the yeast and may accordingly require a longer or shorter period.

It will be understood that air is admitted to each vessel when liquor is being withdrawn therefrom in order that the flow of liquor may be uninterrupted; but such air may be suitably sterilized before admission, as by being drawn through an air-filter, such as is represented at k in the drawing, or at l, the filter in the latter case being applied to the end of an ordinary stand-glass m. It will also be understood that after the withdrawal of the liquor from the vessel in which the first fermentation is carried on such vessel is opened, the waste yeast and undesirable matters are removed, and the vessel itself is cleaned and sterilized in readiness to receive liquor with the new yeast in suspension for the secondary fermentation and the separation of the yeast. It will be obvious that by following the process herein described the contamination of the new yeast from any external source may be wholly avoided and that it will be possible to maintain pure culture yeast continuously throughout successive fermentations with a resulting production of pure fermented liquor, while at the same time a material saving in labor and expense is effected.

I claim as my invention—

1. The improvement in the art of manufacturing fermented liquor which consists in carrying on the first or main fermentation in a closed vessel, separating the liquor with the active yeast from the waste yeast and foreign matters, transferring the liquor carrying in suspension the yeast for further use to another vessel, separating, in the second vessel, the liquor from such yeast, and removing the liquor and introducing other liquor to be fermented into the second vessel without removing the yeast therefrom.

2. The improvement in the art of manufacturing fermented liquor which consists in carrying on the first or main fermention in a closed vessel, separating the liquor with the active yeast from the waste yeast and foreign matters transferring the liquor carrying in suspension the yeast for further use to another closed vessel, separating, in the second vessel, the liquor from such yeast, and removing the liquor and introducing other liquor to be fermented into the second vessel without removing the yeast therefrom, and aerating the liquor inoculated with the yeast as soon as a rise in the temperature manifests itself.

This specification signed and witnessed this 7th day of February, A. D. 1902.

JOSEPH SCHNEIBLE.

In presence of—
ANTHONY N. JESBERA,
M. A. BRAYLEY.